United States Patent [19]

Frazier

[11] Patent Number: 5,493,517
[45] Date of Patent: Feb. 20, 1996

[54] CARGO CONTAINER MAPPING SYSTEM

[75] Inventor: Lawrence M. Frazier, W. Covina, Calif.

[73] Assignee: Hughes Missile Systems Company, Los Angeles, Calif.

[21] Appl. No.: 709,466

[22] Filed: Jun. 3, 1991

[51] Int. Cl.$^6$ .............................. G01B 7/04; G01B 7/24
[52] U.S. Cl. .................... 364/564; 324/226; 324/243; 324/260; 340/551; 340/572; 340/941; 378/51; 378/57; 378/62
[58] Field of Search .................. 324/243, 226, 324/232, 239, 260–262, 236; 364/560, 564; 340/941–943, 551, 572; 378/51, 57, 58, 62

[56] References Cited

U.S. PATENT DOCUMENTS

| | | | |
|---|---|---|---|
| 3,644,825 | 2/1972 | Davis, Jr. et al. | 340/941 |
| 3,763,424 | 10/1973 | Bennett, Jr. et al. | 324/226 |
| 4,109,199 | 8/1978 | Ball et al. | 324/202 |
| 4,250,451 | 2/1981 | Slagle | 324/243 |
| 4,642,786 | 2/1987 | Hansen | 324/207.16 |
| 4,755,753 | 7/1988 | Chern | 324/243 |
| 4,773,029 | 9/1988 | Claesson et al. | 364/564 |
| 4,821,023 | 4/1989 | Parks | 340/551 |
| 4,866,424 | 9/1989 | Parks | 340/551 |
| 4,879,752 | 11/1989 | Aune et al. | 378/51 |
| 4,939,459 | 7/1990 | Akachi et al. | 324/247 |
| 5,001,458 | 3/1991 | Tyren et al. | 340/572 |
| 5,023,805 | 6/1991 | Aune et al. | 378/51 |
| 5,047,718 | 9/1991 | Aittoniemi et al. | 340/551 |
| 5,083,200 | 1/1992 | Deffontaines | 364/560 |
| 5,103,209 | 4/1992 | Lizzi et al. | 340/572 |
| 5,105,151 | 4/1992 | Takahashi et al. | 324/243 |
| 5,121,105 | 6/1992 | Aittoniemi | 340/551 |
| 5,125,015 | 6/1992 | Shimoni et al. | 378/57 |

*Primary Examiner*—Emanuel T. Voeltz
*Assistant Examiner*—Eric W. Stamber
*Attorney, Agent, or Firm*—Charles D. Brown; Randall M. Heald; Wanda K. Denson-Low

[57] ABSTRACT

A system for scanning the interior of a cargo container includes a propagator device for producing a magnetic field at each of (I) positions adjacent a first side of a cargo container and a detector device for detecting magnetic field strength at each of (J) positions adjacent a second side. The (I) positions are spaced apart in a direction generally parallel to a Y axis of a Cartesian coordinate system and components are included for mapping information about magnetic field strength at each of the (J) positions for each of (K) positions of the cargo container as it passes between the propagator and detector devices in a direction generally parallel to an X axis. Spaced apart orthogonal propagator and detector elements may be disposed in vertical columns adjacent the cargo container, and computerized control components may be used to map and process the information and to produce and display an image. The system may include a second propagator-detector pair disposed horizontally for mapping information for the X-Z plane and that information may be used to shade the X-Y plane image or to produce an X-Z plane image.

24 Claims, 4 Drawing Sheets

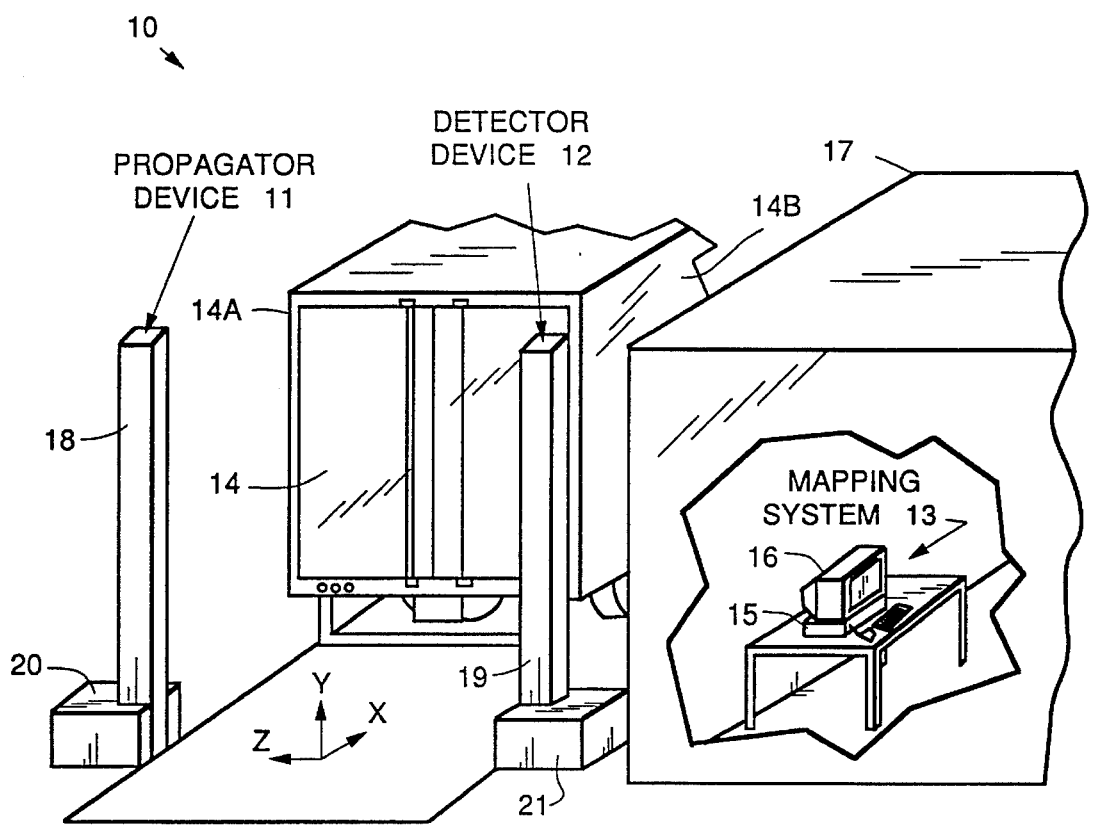
FIG. 1a.
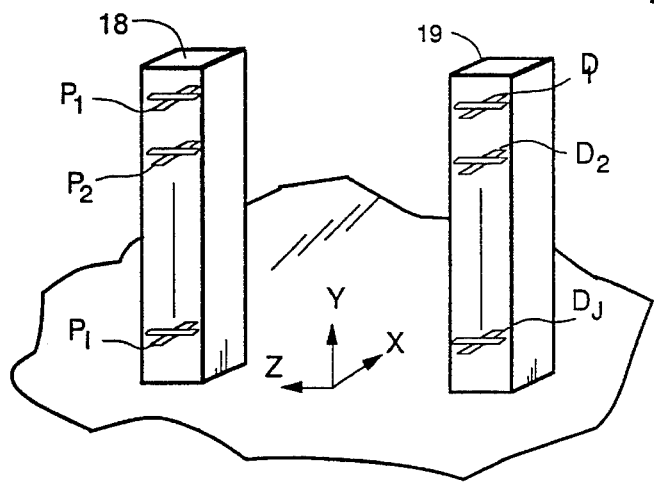
FIG. 1b.
FIG. 1c.
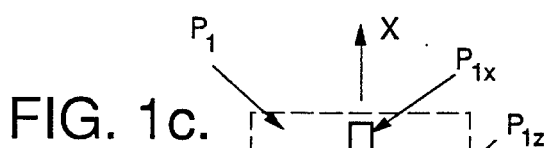
FIG. 1d.

CARGO CONTAINER MAPPING SYSTEM

BACKGROUND OF THE INVENTION

1. Technical Field

This invention relates generally to systems and methods for inspecting the interior of a container, and more particularly to a system and related methodology for mapping information about the interior of a metal cargo container that can be used to produce an image representing container contents.

2. Background Information

Metal cargo containers appear in various forms, such as semi-trucks, box cars, and the large metal shipping containers used worldwide on ships and railroad flat cars. They enjoy widespread use for holding and protecting various types of legitimate goods during shipment. But illegal items ranging from stolen cars and weapons to drugs also find their way into some metal cargo containers and so inspecting personnel need effective means for conveniently examining cargo container contents.

Existing scanning systems do not readily adapt to the task. Those used at airports to scan baggage are far too small for large cargo containers. In addition, adapting existing X-ray scanners and the like to large, metal cargo containers introduces other problems, such as the need for significant power and the potential hazards of X rays. Furthermore, metal cargo container walls can defeat systems attempting to pass ultrasonic or rf energy through the container. Thus, inspecting personnel need a scanning system that overcomes those drawbacks. In addition, the system should be sufficiently portable to enable use at locations where metal cargo containers may be found while being conveniently installable at existing inspection stations.

SUMMARY OF THE INVENTION

This invention solves the problems outlined above by providing a system that propagates a magnetic field through the cargo container while mapping perturbations in the field caused by cargo container contents. In other words, the system uses the ability of a low-power magnetic field to permeate the interior of a metal cargo container despite the conductive metal walls. As the magnetic field illuminates the container interior in that way, the system accumulates information about perturbations in the field as a profile of container contents. Thus, the system takes less power. It avoids X-ray hazards. It overcomes metal-wall blockage of ultrasonic and rf energy. In addition, it may be made portable and conveniently installable at existing stations.

Generally, a system constructed according to the invention for scanning the interior of a cargo container includes a magnetic field propagator device, a field strength detector device, and means responsive to the detector device for mapping information about perturbations in the magnetic field. The propagator device includes components for producing a magnetic field at each of (I) propagator positions adjacent one side of a cargo container. The detector device includes components for sensing magnetic field strength at each of (J) detector positions adjacent another side of the cargo container. The mapping means includes components responsive to the detector device for mapping information about variations in magnetic field strength at each of the (J) detector positions as the cargo container passes between the propagator and detector devices.

The number of propagator and detector positions may vary within the broader inventive concepts disclosed, as may the location and arrangement of the propagator and detector devices. But to map the interior of a truck, for example, the system may include eight or more propagator elements (I=8) arranged in one vertical column at one-foot (30.48 cm) intervals and eight or more detector elements (J=8) arranged in another vertical column at one-foot (30.48 cm) intervals. Individual ones of the (I) propagator elements are energized sequentially to produce a magnetic field at each of (I) propagator positions, and that field propagates toward a respective one of (J) detector positions in the other vertical column for detection by a respective one of the (J) detector elements.

The two vertical columns may be located at a truck weighing station, for example, where they are spaced apart sufficiently to enable trucks to drive between them ... about ten to twelve feet (3.05–3.66 meters). As a truck passes between the two columns, it affects the strength of the magnetic field strength propagated from the (I) propagator positions to the (J) detector positions according to the size, shape, and magnetic characteristics of its contents. So, the mapping means is configured to gather information about magnetic field strength at each of the (J) detector positions for each of a series of truck positions. It electronically scans vertically as the truck moves horizontally. In that way, it accumulates a two-dimensional array of information that can be used to produce an image representing the truck contents.

In other words, the system divides the truck into a number of vertical slices and stores information about the magnetic field strength at each of the (J) vertically spaced-apart detector positions for each slice in order to accumulate the two-dimensional array of information. The technique can be extended to three dimensions by including another propagator-detector pair that is oriented horizontally in order to accumulate additional information for a three-dimensional array. That enables more extensive imaging and better identification of the contents.

In line with the above, a method for scanning the interior of a cargo container includes the steps of producing a magnetic field at each of (I) propagator positions adjacent a first side of a cargo container and detecting magnetic field strength at each of (J) detector positions adjacent a second side of the cargo container. The method proceeds by mapping information about the magnetic field strength at each of the (J) detector positions for each of a series of cargo container positions as the cargo container moves between the propagator and detector positions. That is done in order to accumulate a two-dimensional array of information that can be used to produce an image representing cargo container contents, and the method may include the step of producing and detecting a magnetic field at additional positions in order to map a three-dimensional array of information for improved imaging and contents identification.

The foregoing and other objects and features of the invention will become more apparent and the invention itself will be better understood by reference to the following detailed description taken in conjunction with the accompanying illustrative drawings.

BRIEF DESCRIPTION OF THE DRAWINGS

FIG. 1a of the drawings is a diagrammatic view of a system constructed according to the invention that is used to scan the interior of a truck;

FIG. 1b shows the two spaced-apart columns of orthogonal propagator and detector elements relative to an X-Y-Z Cartesian coordinate system;

FIG. 1c is an enlarged diagrammatic representation of an orthogonal propagator element in a horizontal plane;

FIG. 1d is an enlarged diagrammatic representation of an orthogonal detector element in a horizontal plane;

DESCRIPTION OF THE PREFERRED EMBODIMENTS

Figure 2:
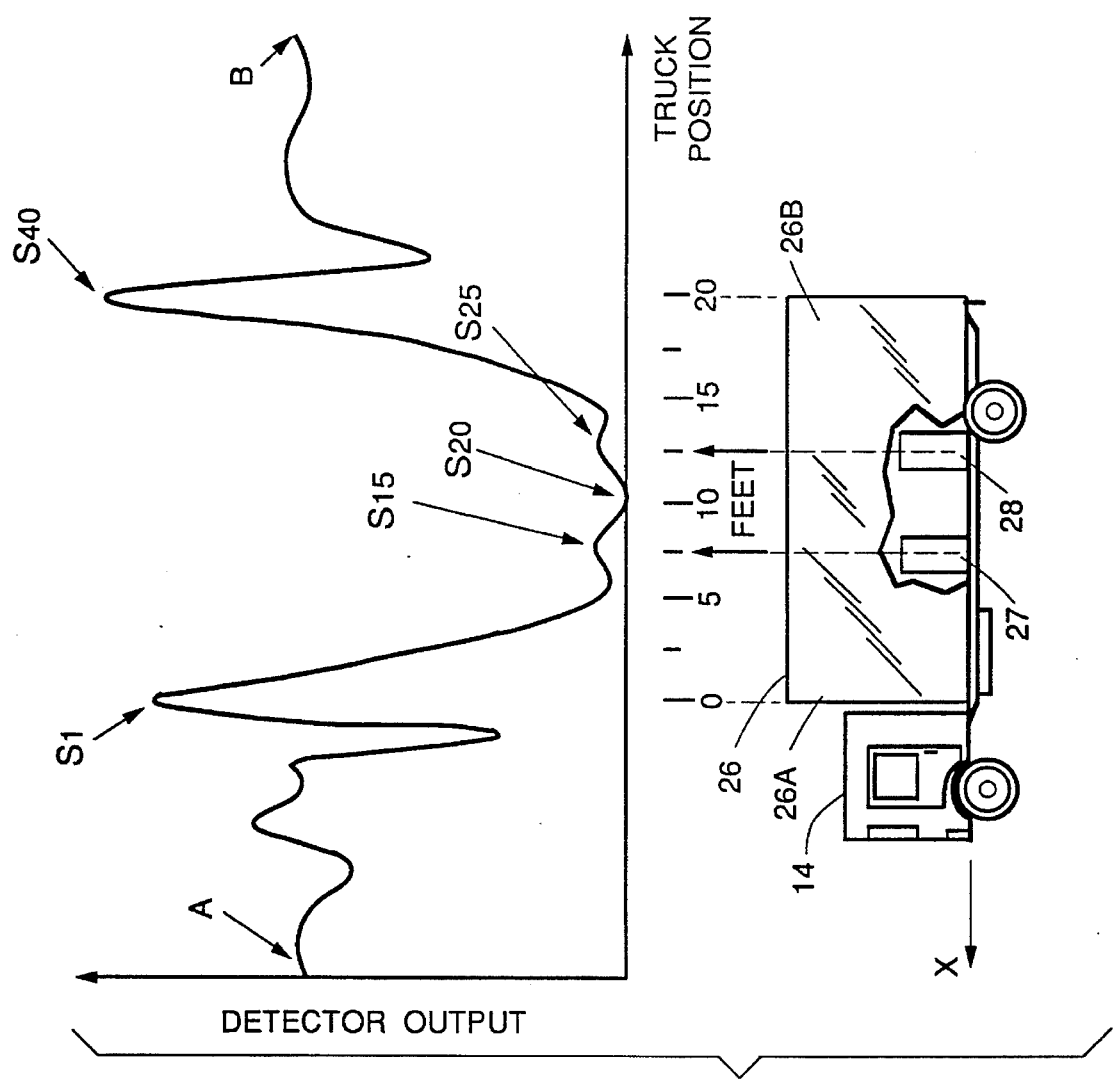
FIG. 2 is a plot representing variations in the output of one detector element occurring for various truck positions along the X axis.

FIGS. 1a–1d of the drawings show details of a system 10 constructed according to the invention. Generally, the system 10 includes a propagator device 11, a detector device 12, and a mapping subsystem 13 (FIG. 1a). Although such elements may be portable, they are illustrated for the system 10 as being installed at a truck weighing station where they are arranged and operationally interconnected as subsequently described in order to map information about the contents of trucks as the trucks pass between the propagator and detector devices 11 and 12.

The propagator device 11 includes components for producing a magnetic field at each of a series of propagator positions adjacent one side of a truck 14 (e.g., a side 14A in FIG. 1a). The detector device 12 includes components for sensing magnetic field strength at each of a series of detector positions adjacent another side of the truck 14 (e.g., a side 14B). In addition, the propagator and detector devices 11 and 12 are spaced apart sufficiently to enable passage of the truck between them. In that regard, the propagator and detector devices 11 and 12 are adjacent the sides of the truck in the sense that they are close enough to the sides 14A and 14B to allow the truck 14 and its contents to cause detectable variations in a magnetic field propagated between the propagator and detector devices without being so close as to significantly interfere with passage of the truck between them.

The mapping subsystem 13 includes components responsive to the detector device 12 for mapping information about variations in magnetic field strength as the truck 14 passes between the propagator and detector devices 11 and 12. For that purpose, the mapping subsystem 13 may include a computer 15 configured to map the information so that it can be used to image the truck contents on a display 16. That enables inspecting personnel to conveniently identify or at least categorize the truck contents by viewing the display 16 from a position within a building 17 as the truck 14 moves slowly forward in front of the building. Depending on system parameters and content characteristics, the image may take the form of a likeness of the outline of ferromagnetic or diamagnetic contents. In other cases, it simply presents what may be referred to as a recognizable signature of the contents that can be used to categorize them.

Concerning the propagator and detector devices 11 and 12, they may include propagator and detector elements arranged in two vertical columns 18 and 19 atop bases 20 and 21 that house propagator and detector circuitry. That arrangement can be conveniently installed at existing inspection stations. Of course, the precise physical arrangement of the system 10 may vary, and the foregoing and subsequent descriptions make it apparent that a cargo container mapping system constructed according to the broader inventive concepts disclosed may be configured in any of various different ways. In order to accomplish relative movement between a cargo container and a propagator-detector pair, for example, the propagator-detector pair may be made movable so that it can be moved past a stationary cargo container. The illustrated system 10 employs stationary propagator and detector devices 11 and 12, however, and they are described in further detail with reference to an X-Y-Z Cartesian coordinate system and generalized integer values (I) and (J) for the number of propagator and detector positions.

Propagator elements $P_1$ through $P_I$ occupy (I) spaced-apart propagator positions in the vertical column 18 (FIG. 1b). Although the number and arrangement of the propagator elements $P_1$–$P_I$ may vary within the broader inventive concepts disclosed, the illustrated propagator device 11 employs eight propagator devices at one foot intervals (i.e., I=8). They are supported in a vertically stacked array (i.e., spaced apart in a direction parallel to the Y axis) by a suitable support structure (not shown) to thereby form the column 18. Preferably, the column 18 is arranged so that the propagator element $P_I$ is located approximately at the height of the truck bed. In addition, the propagator elements are preferably enclosed for security purposes and to protect them from the weather. Other physical arrangements may also be used within the inventive concepts disclosed. The column 18 may be configured to extend telescopingly, for example, in order to enable inspecting personnel to raise or lower the propagator elements and change their spacing according to the dimensions of the truck 14 or other cargo container being inspected. Each of the propagator elements $P_1$–$P_I$ is periodically energized, preferably sequenced with predetermined timing so that only one propagator element is energized at any one time. In other words, each of the propagator elements is pulsed on and off, preferably with step function or impulse function excitation, and that results in each of the propagator elements producing a magnetic field at a respective one of the (I) propagator positions that propagates toward the (J) detector positions.

Detector elements $D_1$ through $D_J$ occupy (J) spaced-apart detector positions in the vertical column 19. Although the number and arrangement of detector elements may also vary, the illustrated detector device 12 employs eight detector elements $D_1$–$D_J$ at one foot intervals in a vertically stacked array (i.e., J=8 ). The column 19 may be arranged physically like the column 18 so that the detector elements $D_1$–$D_J$ are suitably supported and enclosed. Preferably, each of the detector elements $D_1$–$D_J$ is in the same X-Z plane as a respective one of the propagator elements $P_1$–$P_I$ so that it is aligned with a respective one of the propagator elements $P_1$–$P_I$.

As the propagator elements $P_1$–$P_I$ pulse on and off, each produces a time-varying magnetic field that can be detected by a respective one of the elements $D_1$–$D_J$. With the truck 14 passing between the columns 18 and 19 as that occurs, the truck 14 (including its contents) affect the level of magnetic field strength that is detected by the detector elements $D_1$–$D_J$. So, the mapping subsystem 13 gathers information from the detector elements $D_1$–$D_J$ about magnetic field strength at each of the (J) detector positions for each of various truck positions along the X axis. In that way, the mapping subsystem 13 scans vertically as the truck 14 moves horizontally in order to accumulate a two-dimensional array of information that can be used to produce an image representing the contents of the truck 14.

Various types and arrangements of magnetic field propagator and detector elements may be used within the broader inventive concepts disclosed. But the sensitivity of each of the detector elements $D_1-D_J$ to the magnetic field produced by the propagator elements $P_1-P_I$ is affected by the orientation of each detector element relative to the propagator element producing the field. With the propagator and detector elements arranged in pairs as illustrated for the system 10, each detector element $D_1-D_J$ is most sensitive to that one of the propagator elements $P_1-P_I$ lying in the same X-Z plane as the detector element, and sensitivity is enhanced by propagator and detector elements having orthogonal sections.

FIG. 1c shows the orthogonal configuration of the propagator element $P_1$ illustrated within a dashed-line box that represents the enclosure the column 18 provides. The propagator element $P_1$ includes a first section $P_{1x}$ aligned with the X axis and a second section $P_{1z}$ aligned with the Z axis. The first section $P_{1x}$ includes a solenoid 22 on a core 23 that is aligned with the X axis, and the second section $P_{1z}$ includes a solenoid 24 on a core 25 that is aligned with the Z axis. Thus, the two element sections $P_{1x}$ and $P_{1z}$ are orthogonal.

The other propagator and detector elements are configured in a similar manner. The detector element $D_1$, for example, includes first and second sections $D_{1x}$ and $D_{1z}$ aligned with respective ones of the X and Z axes (FIG. 1d). It lies in the same X-Z plane as the propagator element $P_1$ and so it can be said to form a propagator-detector element pair with the propagator element $P_1$. So arranged, the first detector section $D_{1x}$ is more sensitive to the field produced by the first propagator section $P_{1x}$ and the second detector section $D_{1z}$ is more sensitive to the field produced by the second propagator section $P_{1z}$.

The positions of the truck along the X axis at which the mapping subsystem 13 accumulates information may vary in number and location. They are subsequently referred to in connection with FIG. 2 as truck positions $S_1$ through $S_K$. The subscript K may equal 40, for example, if the truck positions are spaced at one-half foot (15.24 cm) intervals for a truck container portion about twenty feet (6.10 meters) long. That is the case in FIG. 2 where the cargo container portion 26 of the truck 14 measures about twenty feet (6.10 meters) long, ten feet high (3.05 meters), and eight feet (2.44 meters) wide. Thus, the position $S_1$ in FIG. 2 is the truck position in which the forward one-half foot 26A (the first slice) of the container portion 26 is aligned with the propagator and detector devices 11 and 12 (i.e., generally between the columns 18 and 19). Similarly, the position $S_{40}$ is the truck position in which the rearward one-half foot 26B (or last slice) of the container portion 26 is aligned with the propagator and detector devices 11 and 12, a position in which the rearward one-half foot 26B of the container portion 26 is generally between the columns 18 and 19.

Variations in magnetic field strength caused by the contents of the truck 14, such as the fifty-gallon (132-liter), steel drums 27 and 28 in FIG. 2) depend on their size, shape, and magnetic characteristics. So mapping information about the magnetic field strength at each of the (J) detector positions provides information that can be used to produce an image representing the contents. The level detected by one of the detector elements $D_1-D_J$ for one of the truck positions $S_1-S_K$ provides information for one element of the image. Thus, as the truck moves between the propagator and detector devices 11 and 12 to each of the (K) truck positions, the system 10 accumulates sufficient information to produce an image of truck contents having J×K elements (i.e., picture elements).

The plot of detector output versus truck position in FIG. 2 demonstrates variations in the strength of the magnetic field detected by one of the detector elements $D_1-D_J$ located at about the same height as the drums 27 and 28. With the propagator element energized by a 1 KHz square wave with approximately 10 watts drive, for example, the detector output is about 100 micro-volts with nothing between the propagator and detector elements (point A in FIG. 2). Then, as the truck 14 moves slowly forward between the propagator and detector elements, the detector element output peaks at the truck position $S_1$ (over 150 micro-volts), where the forward part 26A lies intermediate the columns 18 and 19. It also peaks at the truck position $S_{40}$, where the rearward part 26B lies intermediate the columns 18 and 19 and then returns to the initial 100 micro-volt level (point B in FIG. 2) as the truck 14 continues to move beyond the propagator and detector elements. Those peaks may represent a magnetic field guiding effect produce by the forward and rearward ends of the container 26 acting as series conductors for the magnetic field.

Between the truck positions $S_1$ and $S_{40}$, the detector output decreases to a minimum at the truck position $S_{20}$, where the central part of the container portion 26 lies intermediate the columns 18 and 19. In that position, the container 26 and its contents (i.e., the drums 27 and 28) are somewhat symmetrically disposed relative to the columns 18 and 19, providing maximum interference to the magnetic field propagating from the column 18 to the column 19. Nevertheless, variations in detector output in the form of minor peaks occur at truck positions $S_{15}$ and $S_{20}$, positions at which the drums 27 and 28 lie intermediate the columns 18 and 19. Variations of that type occur regardless of whether the metal cargo container walls are ferrous (e.g., steel) or non-ferrous (e.g., aluminum). They provide imaging information and the mapping subsystem 13 maps information about them for imaging purposes. The mapping subsystem 13 may store such information in the computer 15 as elements of a J×K matrix, for example, and then use it to produce a graphic image with the display 16 shown in FIG. 1a.

Thus, the propagation of magnetic waves provides interesting possibilities for the transmission of these waves through various media previously considered effective shields. A sufficient magnetic field can be developed by applying a time-varying current to a propagator element in the form of a solenoid on a ferromagnetic core, and the field can be detected by a similar solenoid at some distance from the first solenoid. In that regard, the magnetic field strength or magnetic intensity H is related to the magnetic induction or magnetic flux density B by, $$B = u*H$$

where "u" is the permeability of the medium. If there are "N" closely grouped turns of wire, rather than a single turn, the magnetic induction at the center of the coil is, $$B = (u*N*I)/2r \text{ webers/meter}$$

where "I" is the current and "r" is the radius of the coil.

The signal intensity as a function of distance follows the equation for magnetic field intensity as, $$V = (k*u)/d^2$$

where "V" is the induced voltage, "u" is the permeability of the solenoid, "d" is the distance between the two solenoids, and "k" is the constant of proportionality.

The amount of attenuation is a function of $1/d^2$ and it is dependent upon the magnetic properties of intervening metallic surfaces, their distance from the propagator and detector elements, and their longitudinal orientation. Whereas electric waves diverge from a point source in a straight line, magnetic lines of force curl. They always leave one end of a magnetic material and return through the other end to form a complete circuit. In other words, they leave the source from one pole, curl around the source, and enter the source from the other pole.

In addition, the magnetic field is greatly affected by any intervening ferromagnetic or diamagnetic materials. Ferromagnetic materials include those containing certain levels of iron or which have a permeability much greater than one, while paramagnetic materials are those having a permeability of very nearly one and diamagnetic materials have a permeability of less than one. The magnetic field passing through a metal surface is bent as a function of the angle of incidence and the permeability of the metal. So, as cargo in the form of a magnetic conductor moves through the field, it produces a detectable variation in the field.

The strength and orientation of the magnetic fields affects system operation. Orthogonal propagator and detector elements enhance sensitivity, and strength can be increased at a distance from the propagator elements by increasing the length of the magnetic field concentrator (i.e., the cores on which the solenoids are wound). Typically, a short core has a very small field strength at a distance as compared to the Earth, for example, which has strong magnetic fields at thousands of miles from the widely separated poles. In other words, the longer the core, the stronger the detected field at a given distance and so the cores of the propagator and detector elements take the form of twenty-four inch long (60.96 cm), soft-iron, laminated bars. The number of turns on the detector elements may be greater that the number of turns on the propagator elements because the propagator elements require heavier wire for the amount of current applied to produce a sufficiently strong magnetic field.

Figure 3:
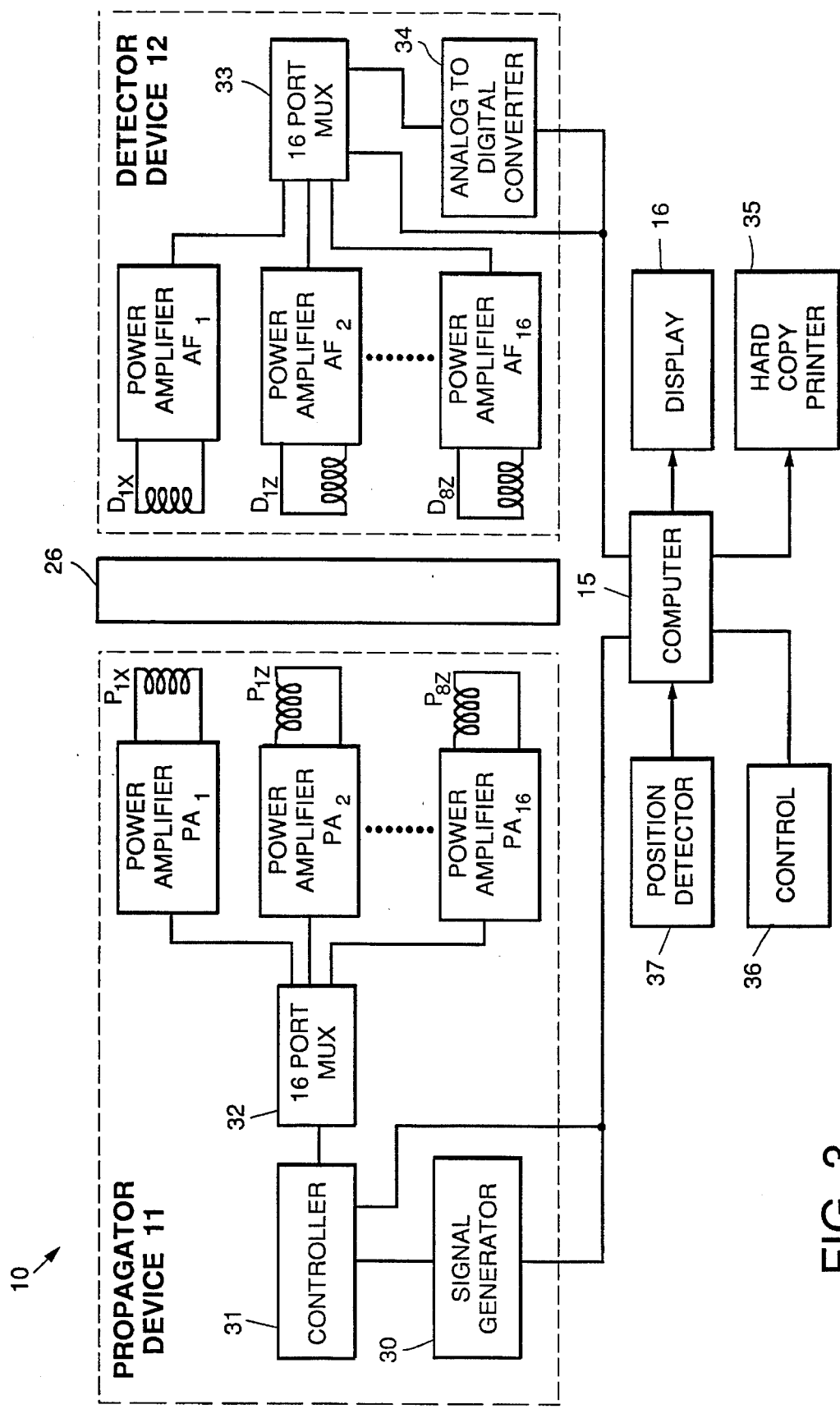
FIG. 3 is a block diagram showing system components in further detail.

Although any of various circuit configurations may be employed to propagate, detect, and map within the broader inventive concepts disclosed, FIG. 3 shows a representative arrangement for the system 10. The output of a signal generator 30 is coupled to each of sixteen power amplifiers $PA_1$–$PA_{16}$ by suitable multiplexing circuitry that includes a controller 31 and a multiplexer 32. The computer 15 is arranged and interconnected to those components to provide overall control so that each of the power amplifiers $PA_1$–$PA_{16}$ drives a respective one of the first and second sections of the orthogonal propagator elements $P_1$–$P_8$ with a desired waveform and timing. In that regard, only the first and second sections $P_{1x}$ and $P_{1z}$ of the propagator element $P_1$ and a second section $P_{8z}$ of the propagator element $P_8$ are shown in FIG. 2 for illustrative convenience.

Similarly, only the first and second sections $D_{1x}$ and $D_{1z}$ of the detector element $D_1$ and a second section $D_{8z}$ of the detector element $D_8$ are shown for the orthogonal detector elements $D_1$–$D_8$. Each of the first and second sections for all of the detector elements $D_1$–$D_8$ are coupled to a respective one of amplifier-filters $AF_1$–$AF_{16}$, however, and those amplifier-filters are then coupled to the computer 15 with suitable circuitry, including a multiplexer 33 and an analog to digital converter 34. The computer is suitably configured and programmed and interconnected with the display 16 as well as a hard copy printer 35 and other desired control components 36. In addition, a position detector 37 inputs information to the computer 15 about the truck positions $S_1$–$S_{40}$. It may include known sensor devices and circuitry for that purpose.

Operationally, the computer 15 controls the timing of the magnetic field produced at each of the propagator positions and accumulates information about the corresponding field strength detected at each of the detector positions. That information is stored in the computer for each of the truck positions detected by the position detector 37, and it is used as desired to produce an image on the display 16. It may also be used to provide printed text or graphics with the printer 35.

Figure 4:
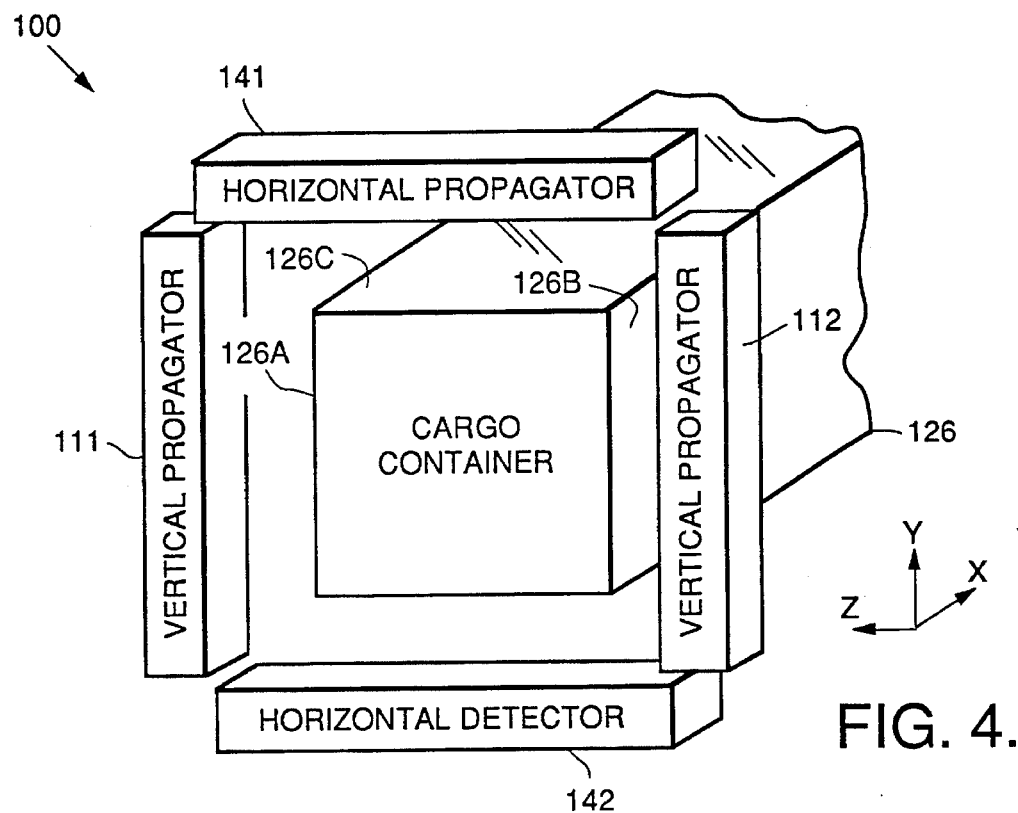
FIG. 4 shows a second system that also includes a horizontally disposed propagator-detector pair for mapping a three-dimensional array of information.
Figure 5:
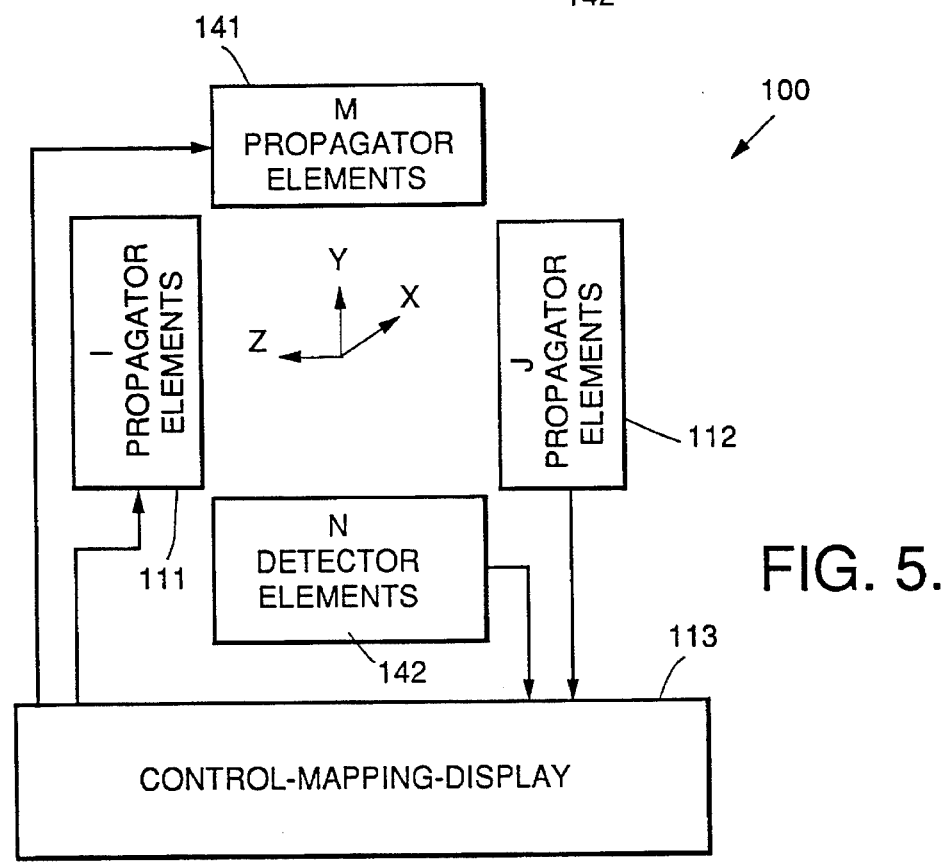
FIG. 5 is a block diagram of the second system.

In other words, the system 10 produces a magnetic field at each of (I) positions adjacent a first side of a cargo container, detects magnetic field strength at each of (J) positions adjacent a second side of the cargo container, and maps information about the magnetic field strength at each of the (J) positions for each of (K) positions of the cargo container in order to accumulate information that can be used to produce an image representing contents of the cargo container. That method is embellished in the system 100 shown in FIGS. 4 and 5 by including additional components arranged to map a three dimensional array of information. It is similar to the system 10 in many respects, so only the differences are described in detail. For convenience, reference numerals designating parts of the system 100 are increased by one hundred over those designating similar parts of the system 10.

Like the system 10, the system 100 includes a propagator device 111 for producing a magnetic field at each of (I) positions adjacent a first side of a cargo container 126 (e.g., a side 126A). It also includes a detector device 112 for sensing magnetic field strength at each of (J) positions adjacent a second side 126B of the cargo container 126, and it includes a mapping subsystem 113 responsive to the detector device 112 for mapping information about magnetic field strength at each of the (J) positions for each of (K) positions of the cargo container. But unlike the system 10, it also includes another propagator-detector pair that is oriented horizontally.

Thus, the system 100 includes a second propagator device 141 for producing a magnetic field each of (M) positions adjacent a third side 126C of the cargo container and a second detector device 142 for sensing magnetic field strength at each of (N) positions adjacent a fourth side 126D of the cargo container. The propagator and detector devices 141 and 142 are spaced apart to enable passage of the cargo container 126 between them and they are otherwise similar in many respects to the propagator and detector device 111 and 112. In that regard, the propagator device 141 includes (M) propagating elements that are similar to the propagating elements $P_1$–$P_I$ and the detector device 142 includes (N) detector devices that are similar to the detector devices $D_1$–$D_J$.

The propagator and detector devices 141 and 142 are oriented differently, however, so that the (M) propagator positions and the (N) detector positions are spaced apart in a direction generally parallel to the Z axis of an X-Y-Z Cartesian coordinate system (that being horizontal for the system 100). In addition, the mapping subsystem 113 is configured to map information about the magnetic field strength at each of the (N) detector positions for each of the (K) cargo container positions in order to provide a three dimensional array of information that can be used for imaging purposes.

Thus, the invention in its various embodiments propagates a magnetic field through the cargo container while mapping perturbations in the field caused by cargo container contents, using the ability of a low-power magnetic field to permeate the interior of a metal cargo container despite the conductive metal walls. The system takes less power. It avoids X-ray hazards. It overcomes metal-wall blockage of ultrasonic and rf energy, and it may be made portable and conveniently installable at existing stations.

Although exemplary embodiments have been shown and described, many changes, modifications, and substitutions may be made by one having ordinary skill in the art without necessarily departing from the spirit and scope of the invention.

What is claimed is:

1. A system for scanning the interior of a cargo container, comprising:

a propagator device for producing a magnetic field at each of (I) positions adjacent a first side of a cargo container;

a detector device for sensing magnetic field strength at each of (J) positions adjacent a second side of the cargo container;

wherein the (J) positions are spaced apart in a direction substantially parallel to a Y axis of a Cartesian coordinate system, and wherein the propagator and detector devices are spaced apart in a direction substantially parallel to a Z axis of the Cartesian coordinate system a predetermined distance sufficient to permit passage of the cargo container between the propagator and detector devices in a direction substantially parallel to an X axis of the Cartesian coordinate system; and mapping means responsive to the detector device for processing signals indicative of the magnetic field strength at each of the (J) positions relative to the cargo container to generate a image representing contents of the cargo container caused by perturbations of the magnetic field strength caused by the contents of the cargo container.

2. A system as recited in claim 1, wherein (I) is greater than one.

3. A system as recited in claim 2, wherein (I) equals (J).

4. A system as recited in claim 2, wherein the (I) positions are spaced apart along a line that is substantially parallel to the Y axis.

5. A system as recited in claim 2, wherein the propagator device is configured to cyclically produce the magnetic field at each of the (I) positions in order to produce the magnetic field from just one of the (I) positions at a time.

6. A system as recited in claim 1, wherein the propagator device is configured to produce at least two different magnetic fields at each of the (I) positions.

7. A system as recited in claim 6, wherein the propagator device is configured so that a first one of the two magnetic fields is aligned in a direction substantially parallel to the X axis and a second one of the two magnetic fields is aligned in a direction substantially parallel to the Z axis.

8. A system as recited in claim 1, wherein the propagator device includes (I) pairs of orthogonal propagator elements.

9. A system as recited in claim 8, wherein each of the (I) pairs of orthogonal propagator elements includes a first electromagnetic device for producing a first magnetic field that is aligned in a direction substantially parallel to the X axis and a second electromagnetic device for producing a second magnetic field that is aligned in a direction substantially parallel to the Z axis.

10. A system as recited in claim 1, wherein the propagator device includes a plurality of propagator elements disposed in a vertical column.

11. A system as recited in claim 1, wherein the detector device includes (J) pairs of orthogonal detector elements, each of which (J) pairs of orthogonal detector elements is located at a respective one of the (J) positions.

12. A system as recited in claim 11, wherein each of the (J) pairs of orthogonal detector elements includes a first detector element aligned in a direction substantially parallel to the X axis and a second detector element aligned in a direction substantially parallel to the Z axis.

13. A system as recited in claim 1, wherein the detector device includes a plurality of detector elements disposed in a vertical column.

14. A system as recited in claim 1, wherein the mapping means includes computer means responsive to the detector device for processing the signals indicative of the magnetic field strength.

15. A system as recited in claim 14, wherein the computer means includes display means for producing an image representing the contents of the cargo container.

16. A system as recited in claim 15, wherein the computer means is configured to produce an image having (J) picture elements by (K) picture elements.

17. A system as recited in claim 1, further comprising:

a second propagator device for producing a magnetic field at each of (M) positions adjacent a third side of the cargo container; and a second detector device for sensing magnetic field strength at each of (N) positions adjacent a fourth side of the cargo container;

the (N) positions being spaced apart in a direction substantially parallel to the Z axis;

the second propagator and second detector devices being sufficiently spaced apart in a direction substantially parallel to the Y axis to enable passage of the cargo container between the second propagator and second detector devices; and the mapping means king further configured to process signals indicative of the magnetic field strength at each of the (N) positions to generate the image representing contents of the cargo container.

18. A system as recited in claim 17, wherein (M) is greater than one.

19. A system as recited in claim 18, wherein (M) equals (N).

20. A system as recited in claim 18, wherein the (N) positions are spaced apart along a line that is substantially parallel to the Z axis.

21. A system as recited in claim 17, wherein the mapping means is configured to produce an image representing cargo container contents in an X-Z plane having (N) picture elements by (K) picture elements.

22. A system for scanning the interior of a cargo container, comprising:

propagator means for producing a magnetic field at each of (I) positions adjacent a first side of a cargo container;

detector means for detecting magnetic field strength at each of (J) positions adjacent a second side of the cargo container, which (J) positions are spaced apart in a direction substantially parallel to a Y axis of a Cartesian coordinate system; and mapping means responsive to the detector means for processing signals indicative of the magnetic field strength at each of the (J) positions relative to the cargo container as the cargo container passes between the propagator means and the detector means in a direction substantially parallel to an X axis of the Cartesian coordinate system to generate an image representing the contents of the cargo container.

23. A method of scanning the interior of a cargo container, comprising:

producing a magnetic field at each of (I) positions adjacent a first side of a cargo container;

detecting magnetic field strength at each of (J) positions adjacent a second side of the cargo container, which (J) positions are spaced apart in a direction substantially parallel to a Y axis of a Cartesian coordinate system; and processing signals indicative of the magnetic field strength at each of the (J) positions relative to the cargo container along a direction substantially parallel to an X axis of the Cartesian coordinate system to generate an image representing contents of the cargo container.

24. A method as recited in claim 23, further comprising producing a magnetic field at each of (M) positions adjacent a third side of the cargo container;

detecting magnetic field strength at each of (N) positions adjacent a fourth side of the cargo container, which (N) positions are spaced apart in a direction substantially parallel to a Z axis of the Cartesian coordinate system; and processing signals indicative of the magnetic field strength at each of the (N) positions relative to the cargo container to generate the image representing contents of the cargo container.

* * * * *